United States Patent [19]

George

[11] Patent Number: 4,851,470
[45] Date of Patent: Jul. 25, 1989

[54] MINERAL FILLED POLYKETONE BLEND

[75] Inventor: Eric R. George, Houston, Tex.

[73] Assignee: Shell Oil Company, Houston, Tex.

[21] Appl. No.: 238,387

[22] Filed: Aug. 31, 1988

[51] Int. Cl.⁴ .............................................. C08G 67/02
[52] U.S. Cl. ..................................... 524/612; 524/425;
524/437; 524/445; 524/451; 524/456; 528/392
[58] Field of Search ............... 524/425, 437, 445, 451,
524/456, 612; 528/392

[56] References Cited

U.S. PATENT DOCUMENTS 2,495,286 1/1950 Brubaker .............................. 260/63
3,694,412 9/1972 Nozaki .................................. 260/63

FOREIGN PATENT DOCUMENTS 121965 10/1984 European Pat. Off. .
181014 5/1986 European Pat. Off. .
1081304 8/1967 United Kingdom .

Primary Examiner—Harold D. Anderson
Assistant Examiner—T. Mason
Attorney, Agent, or Firm—Wendy K. B. Buskop

[57] ABSTRACT

A composition comprising a non-miscible blend of, as a major component, a linear alternating polymer of carbon monoxide and at least one ethylenically unsaturated hydrocarbon and a lesser amount of a mineral filler.

11 Claims, No Drawings

MINERAL FILLED POLYKETONE BLEND

FIELD OF THE INVENTION

This invention relates to an improved polymer blend comprising predominantly a linear alternating polymer of carbon monoxide and at least one ethylenically unsaturated hydrocarbon. More particularly, the invention relates to binary blends comprising a major proportion of the linear alternating polymer and lesser proportions of mineral fillers.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar materials of higher carbon monoxide content in the presence of alkylphosphine complexes of palladium salts as catalyst. Nozaki extended the process to prepare linear alternating polymers in the presence of arylphosphine complexes of palladium moieties and certain inert solvents. See, for example, U.S. Pat. No. 3,964,412.

More recently, the class of linear alternating polymers has become of greater interest in part because of the greater availability of the polymers in quantity. These polymers, often referred to as polyketones or polyketone polymers, have been shown to be of the repeating formula —CO—(Z)— wherein Z is a moiety of ethylenically unsaturated hydrocarbon polymerized through the ethylenic unsaturation. By way of further example, when the unsaturated hydrocarbon is ethylene, the polyketone polymer will be of the repeating formula —CO—(CH$_2$—CH$_2$)—. The general process for the more recent preparation of such polymers is illustrated by a number of Published European patent applications including Nos. 121,965 and 181,014. The process typically involves a catalyst composition formed from a salt of a Group VIII metal selected from palladium, cobalt or nickel, the anion of a strong non-hydrohalogenic acid and a bidentate ligand of phosphorus, arsenic or antimony.

The resulting polyketone polymers are relatively high molecular weight thermoplastics having established utility in the production of shaped articles such as containers for the food and drink industry and internal and external parts for the automotive industry, which articles are produced by conventional techniques such as injection molding or extrusion. For some particular applications it has been found to be desirable to have properties for a polymeric composition which are somewhat different from those of the polyketone polymers. It would be of advantage to retain the more desirable properties of the polyketone polymers and yet improve other properties. These advantages are often obtained through the provision of a polymer blend.

SUMMARY OF THE INVENTION

The present invention contemplates the provision of blends of a linear alternating polymer of carbon monoxide and at least one ethylenically unsaturated hydrocarbon with other polymeric materials. More particularly, there are provided, according to the invention, binary blends comprising a major proportion of the linear alternating polymer and lesser amounts of one or more mineral fillers.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic containing an aromatic substituent on an otherwise aliphatic molecule, particularly an aromatic substituent on a carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymers is that of a linear alternating polymer of carbon monoxide and hydrocarbon(s) and there will be substantially one molecule of carbon monoxide for each molecule of hydrocarbon. When terpolymers of carbon monoxide, ethylene and a second hydrocarbon are employed as a component in the blends of the invention, there will be at least two units incorporating a moiety of ethylene for each unit incorporating a moiety of the second hydrocarbon. Preferably there will be from about 10 to about 100 units incorporating a moiety of ethylene for each unit incorporating a moiety of the second hydrocarbon. The polymer chain is therefore represented by the repeating formula

wherein G is the moiety of the second ethylenically unsaturated hydrocarbon polymerized through the ethylenic unsaturation. The —CO—(CH$_2$—CH$_2$)— units and the —CO—(G)— units are found randomly throughout the polymer chain and the ratio of y:x is no more than about 0.5. In the modification of the invention where copolymer of carbon monoxide and ethylene is employed as the blend component, there will be no second hydrocarbon present and the polyketone polymer is represented by the above formula wherein y is 0. When y is other than 0, i.e. terpolymers are employed, ratios of y:x from about 0.01 to about 0.1 are preferred. The end groups or "caps" of the polymer chain will depend on what materials are present durng the preparation of the polymer and whether and how the polymer has been purified. The precise properties of the polymer will not depend to any considerable extent upon the end groups so that the polymer is fairly represented by the above formula for the polymer chain.

Of particular interest are the polyketone polymers of number average molecular weight from about 1,000 to about 200,000, particularly those polyketone polymers of number average molecular weight from about 20,000 to about 90,000, as determined by gel permeation chromatography (GPC). The physical properties of such polymers will depend in part upon the molecular weight of the polymer, whether the polymer is a copolymer or a terpolymer and, in the case of terpolymers, the proportion of the second hydrocarbon present. Typical melting points of the polymers are from about 175° C. to about 300° C., more frequently from about 210° C. to about 270° C. The polymers have a limiting viscosity number (LVN) measured in a standard capillary viscosity measuring device in m-cresol at 60° C., of from about 0.4 to about 10, preferably from about 0.5 to about 4. Polyketone polymers having an LVN of from about 1.4 to about 5 are particularly preferred.

A method of preparing the polymers which is now becoming conventional is to contact the carbon monoxide and hydrocarbon(s) in the presence of a catalyst composition formed from a palladium compound, the anion of a non-hydrohalogenic acid having a pKa below about 6, preferably below about 2, and a bidentate ligand of phosphorus. The scope of the process for polyketone preparation is extensive but, without wishing to be limited, a preferred palladium compound is a palladium carboxylate, particularly palladium acetate, the preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane. Such a process for polyketone production is illustrated by copending U.S. patent application Ser. No. 930,468, filed Nov. 14, 1986 (Docket No. K-0722).

Polymerization is conducted in a gas phase in the substantial absence of reaction diluent or in a liquid phase in the presence of a reaction diluent such as an alkanol, e.g., methanol or ethanol. The reactants are contacted under polymerization conditions in the presence of the catalyst composition by conventional methods such as shaking or stirring in a suitable reaction vessel. Typical reaction temperatures are from about 20° C. to about 150° C., more often from about 50° C. to about 135° C. Suitable reaction pressures are from about 1 bar to about 200 bar, preferably from about 10 bar to about 100 bar. Subsequent to reaction, the polymer is recovered by conventional techniques such as filtration or decantation. The polymer product may contain residues of the catalyst composition which are removed, when desired, by treatment of the polymer product with a solvent or a complexing agent which is selective for the residues.

The second component of the binary blends of the invention is a mineral filler, such as talc, clay, silica, calcium carbonate, calcium carbonate coated with an acidic substance such as stearic acid, wollastonite, franklinite and/or mixtures thereof. Kaolin clay 90A from J. M. Hughes and microwhite SAM SSA-458 from ECC International (a stearic and coated calcium carbonate) are expected to be particularly useful herein.

These mineral filler components are used with the novel polyketone to improve modulus, tensile strength, and HDT (heat distortion temperatures at 66 psi and 264 psi).

The mineral filler may aid to reduce and/or control mold shrinkage of the resultant polyketone polymer blend. Physical and thermal properties of the resultant polymer blend may be affected by the characteristics of the mineral fillers, such as the shape of the filler particles, the size of the filler particles, the size distribution of the filler particles, and surface area of the filler particles. For example, wollastonite, with a specific gravity of 2.9, hardness of 4.5, melting point of 1540° C., and water content of 0.5% has significantly different characteristics from a substance such as mica with a specific gravity of 2.74–2.95, hardness of 2.4–3 and a melting point of 1300° C. Wollastonite is expected to improve the heat deflection temperature of the polyketone polymer as well as reduce the polyketone's thermal expansion coefficient, increase density of the blend and reduce the polymer's mold cycle time.

The following Table 1 provides details on fillers that should be particularly usable herein:

TABLE 1

|  | Wollastonite | Aluminum Trihydrate | Talc | Silica | Clay | Franklinite |
| --- | --- | --- | --- | --- | --- | --- |
| Water Content (%) | 0.5 | 34.6 | 4.8 | <0.1 | 0.5 | <1.0 |
| Specific Gravity | 2.9 | 2.42 | 2.7–2.8 | 2.65 | 2.50 | 3.0 |
| Hardness (Mohs) | 4.5 | 2.5–3.5 | 1.0 | 7.0 | 4.0–6.0 | 2.0 |
| Melting Point (°C.) | 1540 | 200–600 | Stable to 380 | Stable to 573 | 1810 | — |
| Shape | Fiber | Plates | Plates | Spheres | Plates | Fibers |

The blends of the invention comprise a major amount of the linear alternating polymer of carbon monoxide and at least one ethylenically unsaturated hydrocarbon with lesser amounts of the mineral filler. Amounts of the mineral filler can be from about 0.1% by weight to about 45% by weight, based on total blend with amounts from about 0.5% by weight to about 20% by weight, being preferred.

Though it has been known for many years that reinforcing plastics with fillers makes the plastic cheaper, certain unexpected results occur with regard to this novel polyketone material when used with certain acidic or basic mineral fillers.

It has been discovered that certain mineral fillers affect the melt processing and oven aging characteristics of the polyketone because of the acid/base relationship between the filler and the polyketone. For example, when the filler is basic, the viscosity of the overall blended polymer matrix increases and thereby, narrows the processing window for the polymer. These basic fillers appear to interact with the polyketone forming enols and ketals along the backbone of the polyketone polymer chain. The formation of these two types of structures along the polymer backbone is believed to enhance flexural strength and flexural modulus of the polymer. Further, when a basic filler is coated with an acidic substance, such as calcium carbonate coated with stearic acid, the expected viscosity effect of the basic filler is somewhat neutralized, resulting in a more broad processing window than non-coated material while providing a system with enhanced flexural modulus and flex strength. These findings are illustrated in the Illustrative Embodiments which appear below.

The method of producing the blends of the invention is not material so long as a relatively uniform distribution of the mineral filler throughout the polyketone is obtained. The blend is a non-miscible blend with the minor components existing as a discrete phase in the polyketone matrix. The blend will not be homogeneous but good results are obtained when the distribution of the mineral filler throughout the polyketone is substantially uniform. The method of producing the blend is that which is conventional for non-miscible polymeric materials. In one modification, the mineral filler and polyketone are mixed and passed through an extruder operating at high RPM to produce the filled blend as an extrudate. In an alternate modification, the components are blended in a mixing device which exhbits high shear.

The blends of the invention may also include conventional additives such as antioxidants, stabilizers, fire retardant materials, mold release agents and other substances which are added to improve the processability of the components or to modify the properties of the resulting blend. Such additives are added by conventional methods prior to, together with or subsequent to the blending of the components.

The blends of the invention are characterized by decreased toughness and impact resistance but are less expensive. The blends are of utility where the articles produced from the blends of the invention are likely to be subjected to impact. The blends are processed by conventional techniques such as injection molding or extrusion into sheets, films, plates or shaped articles. The formed polymer articles find utility in the packaging industry, in the production of containers as for food or drink and in the production of external and internal parts for automotive applications.

The invention is further illustrated by the following Illustrative Embodiments which should not be regarded as limiting.

Illustrative Embodiment I

A linear alternating terpolymer (88/088) was prepared employing a catalyst composition formed from palladium acetate, the anion of trifluoroacetic acid and 1,3-bis[di(2-methoxyphenyl)phosphino]propane. The terpolymer had a melting point of 223° C. and a limiting viscosity number (LVN), measured at 60° C. in m-cresol, of 1.73.

Illustrative Embodiment II

The linear alternating polyketone of Embodiment I was blended with varying amounts of calcium carbonate, with a pH of about 9 available as Ultrapflex ® from Pfizor.

The blends were prepared by dry mixing pellets of the terpolymer with calcium carbonate powder in a tumbler. The tumbled mixture was melt blended in a 30 mm co-rotating twin screw extruder having seven zones and a total L/D of 27/1. The melt temperature at the die exit was about 260° C. and the zone temperatures along the barrel were maintained at about 466° F. After blending, the material was extruded and pelletized in a conventional manner. The pellets were then oven dried for about 6 hours in a 140° F. oven.

Samples of the pellets were prepared for testing by injection molding the pellets into tensile bars and similar family test bars. An Engel (8 oz) injection molder equipped with a 2.2/1 compression ratio screw can be used. The cycle time for all samples in the Engel can be about 10-40 seconds.

Two different blends of calcium carbonate with the polyketone of Illustrative Embodiment I were prepared and tested. A control sample of the polyketone was also prepared and tested. The results appear below in Table 1.

TABLE 1

|  | Formulation A | Formulation B | Formulation C |
| --- | --- | --- | --- |
| 088/008 polyketone (%) | 100 | 99 | 90 |
| Calcium Carbonate (%) | — | 1 | 10 |
| Flex Strength[1] (psi) | 8082 | 8890 | 9366 |
| Flex Modulus[1] (psi) | 248,000 | 282,000 | 305,000 |

[1]ASTM Test D790

Illustrative Embodiment III

The linear alternating polyketone of Embodiment I was blended with varying amounts of wollastonite, with a pH of 7.7, known as Vansil W10, available from R T Vanderbilt, Co.

The blends were prepared by dry mixing pellets of the terpolymer with the wollastonite in a tumbler. The tumbled mixture was melt blended in a 30 mm co-rotating twin screw extruder having seven zones and a total L/D of 27/1. The melt temperature at the die exit was about 260° C. and the zone temperatures along the barrel were maintained at about 466° F. After blending, the material was extruded and pelletized in a conventional manner. The pellets were then oven dried for about 6 hours in a 140° F. oven.

Samples of the pellets were prepared for testing by injection molding the pellets into tensile bars and similar family test bars. An Engel (8 oz) injection molder equipped with a 2.2/1 compression ratio screw can be used. The cycle time for all samples in the Engel can be about 10-40 seconds.

Two different blends of wollastonite with the polyketone of Illustrative Embodiment I were prepared and tested. The test results appear below in Table 2.

TABLE 2

|  | Formulation C | Formulation D |
| --- | --- | --- |
| 088/008 Polyketone (%) | 99 | 90 |
| Wollastonite (%) | 1 | 10 |
| Flex Strength (psi)[1] | 8029 | 9251 |
| Flex Modulus (psi)[1] | 253,000 | 301,000 |

[1]ASTM Test D790

It is expected that for certain other mineral fillers, such as the acid fillers and polyketone blend, the moldability of the polyketone polymer will improve, that the stability of the filled polymer will improve, and that a significant cost reduction will result in making the polymer (since fillers are cheaper than the polyketone polymer they replace).

It is expected that certain mineral fillers, like calcium carbonate, are advantageous in that they increase the ability of the base polyketone polymer to resist a flame.

Other fillers are expected to improve electrical properties of the base polyketone resin.

Mechanical aspects of the polymer, i.e. tensile strength and heat deflection temperatures may be improved by incorporating certain other fillers into the polyketone polymer.

It is expected that all mineral fillers will advantageously aid in reducing mold shrinkage for the base polyketone polymer. Plate-like fillers are expected to reduce warpage.

In sum, it is expected that different fillers will yield polyketone polymer blends with a wide range of advantageous properties.

What is claimed is:

1. A composition comprising a non-miscible blend of, as a major component, a linear alternating polymer of carbon monoxide and at least one ethylenically unsaturated hydrocarbon and a lesser amount of a mineral filler.

2. The composition of claim 1 wherein the linear alternating polymer is represented by the repeating formula $$-[-CO-(CH_2-CH_2)-]_x-[-CO-(G)-]_y-$$

wherein G is the moiety of ethylenically unsaturated hydrocarbon of at least 3 carbon atoms polymerized through the ethylenic unsaturation and the ratio of y:x is no more than about 0.5.

3. The composition of claim 2 wherein the mineral filler is present in amounts from about 0.1% by weight to about 45% by weight, of the total blend.

4. The composition of claim 3 wherein y is zero.

5. The composition of claim 3 wherein G is a moiety of propylene.

6. The composition of claim 5 wherein the ratio of y:x is from about 0.01 to about 0.1.

7. The composition of claim 5 wherein the mineral filler is selected from the group: calcium carbonate, acid coated calcium carbonate, talc, aluminum trihydrate, silica, clay, wollastonite, or franklinite.

8. The composition of claim 7, wherein the acid coated calcium carbonate is calcium carbonate coated with stearic acid.

9. The composition of claim 7 wherein the mineral filler is present in amounts from about 0.5% by weight to about 20% by weight based on total polymer blend.

10. The composition of claim 9 wherein the ratio of y:x is from about 0.01 to about 0.1.

11. An article of manufacture, a molded article, prepared from the composition according to claim 1.

* * * * *